United States Patent [19]
Miura

[11] Patent Number: 5,913,351
[45] Date of Patent: Jun. 22, 1999

[54] TILT HINGE

[75] Inventor: Fumiaki Miura, Kanagawa, Japan

[73] Assignee: Katoh Electrical Machinery Co., Ltd., Kanagawa, Japan

[21] Appl. No.: 08/890,147

[22] Filed: Jul. 9, 1997

[30]     Foreign Application Priority Data

Jul. 10, 1996  [JP]  Japan .................................. 8-180757

[51] Int. Cl.$^6$ ................................................ E05C 17/64
[52] U.S. Cl. ............................. 16/340; 403/111; 403/103
[58] Field of Search ............................ 16/340, 337, 338, 16/374, 376, 278, 341; 403/111, 103; 361/682, 681

[56]             References Cited

U.S. PATENT DOCUMENTS

| | | | |
|---|---|---|---|
| 5,208,944 | 5/1993 | Lu | 16/340 |
| 5,239,731 | 8/1993 | Lu | 16/340 |
| 5,269,047 | 12/1993 | Lu | 16/340 |
| 5,772,351 | 6/1998 | Ching | 16/340 |

*Primary Examiner*—Chuck Y. Mah
*Attorney, Agent, or Firm*—Notaro & Michalos P.C.

[57]            ABSTRACT

A tilt hinge designed small in size and capable of gaining a great torque, comprising a bracket to be mounted on an apparatus body side, a rotating shaft so constituted as to be mounted on an opening-closing body which is rotatably mounted on a bearing section of the bracket, a first friction plate interposed to rotate together with the rotating shaft while being inserted into the center section between the large-diameter portion of the rotating shaft and one side of the bearing section, a second friction plate mounted on the other side of the bearing section with the rotating shaft being inserted into the center section, a nut mounted to press the spring washer on one end of the rotating shaft toward the bearing section side, a retaining washer interposed between the nut and the second friction plate with the rotating shaft being inserted into the center section, and a spring washer interposed between the retaining washer and the friction plate with the rotating shaft being inserted into the center section.

10 Claims, 2 Drawing Sheets

TILT HINGE

BACKGROUND OF THE INVENTION

1. Field of the Invention

The present invention relates to a tilt hinge best suited for supporting, at an intermediate angle of opening with respect to an apparatus body, a display body (an opening-closing body) of an office automation equipment such as a small-type word processor, notebook type personal computer, etc., and a small-type liquid crystal television set.

2. Description of the Related Art

This type of heretofore known tilt hinge comprises a bracket to be mounted on an apparatus body side, a rotating shaft so designed as to be mounted on the end portion of an opening-closing body which is rotatably mounted on a bearing section of the bracket, a sliding plate interposed, with the rotating shaft inserted in the central section, between a large-diameter portion of the rotating shaft and one side of the bearing section, and a friction plate, a spring washer and a retaining washer; the aforesaid friction plate being pressed against the bearing section with spring washer elasticity generated by staging the end of the rotating shaft, to thereby produce a friction torque between the friction plate and the bearing section when the rotating shaft is rotated.

The above-described conventional tilt hinge, being simple in construction, is best suited for use in such office automation equipment as a laptop word processor, a personal computer, etc. which do not require a high torque. There, however, is the problem that the conventional tilt hinge is not fully usable in a small-type office automatic apparatus, a liquid crystal television set, etc. which require the use of a smaller-diameter rotating shaft and a greater torque.

SUMMARY OF THE INVENTION

It is an object of the present invention to provide a tilt hinge which is capable of gaining a great torque if used on a smaller-diameter rotating shaft than conventional one.

To accomplish the above object, the present invention comprises a bracket to be mounted on an apparatus body side, a rotating shaft so designed as to be mounted on the end portion of an opening-closing body which is rotatably mounted on a bearing section of the bracket, a first friction plate interposed to rotate together with the rotating shaft while being inserted into the center section between the large-diameter portion of the rotating shaft and one side of the bearing section, a second friction plate mounted on the other side of the bearing section with the rotating shaft being inserted into the center section, a nut mounted to press the spring washer on one end of the rotating shaft toward the bearing section side, a retaining washer interposed between the nut and the second friction plate with the rotating shaft being inserted into the center section so as to turn together with the rotating shaft, and a spring washer interposed between the retaining washer and the friction plate with the rotating shaft being inserted into the center section.

The present invention also comprises a bracket to be mounted on an apparatus body side, a rotating shaft so designed as to be mounted on an opening-closing body which is rotatably mounted on a bearing section of the bracket, a first friction plate interposed to rotate together with the rotating shaft while being inserted into the center section between the large-diameter portion of the rotating shaft and one side of the bearing section, a second friction plate mounted on the other side of the bearing section with the rotating shaft being inserted into the center section so as to turn together with the rotating shaft, a nut mounted to press the spring washer on one end of the rotating shaft toward the bearing section side, a retaining washer interposed between the nut and the second friction plate with the rotating shaft being inserted into the center section so as to turn together with the rotating shaft, and a spring washer interposed between the retaining washer and the friction plate with the rotating shaft being inserted into the center section.

Furthermore, the present invention comprises a bracket to be mounted on an apparatus body side, a rotating shaft so designed as to be mounted on the end portion of an opening-closing body which is rotatably mounted on a bearing section of the bracket, a first friction plate interposed to rotate together with the rotating shaft while being inserted into the center section between the large-diameter portion of the rotating shaft and one side of the bearing section, a second friction plate fixedly mounted on the bracket with the rotating shaft being inserted into the center section on the other side of the bearing section, a nut mounted to press the spring washer on one end of the rotating shaft toward the bearing section side, a retaining washer interposed between the nut and the second friction plate with the rotating shaft being inserted into the center section so as to turn together with the rotating shaft, and a spring washer interposed between the retaining washer and the friction plate with the rotating shaft being inserted into the center section.

According to the present invention, at this time, when the first friction plate and/or the second friction plate is so constituted as to turn together with the rotating shaft, the first and second friction plate mounting sections of the rotating shaft may be changed in a sectional form into a modified shaft portion and furthermore the insertion holes of the first and second friction plates into which the modified shaft portion will be inserted may be changed in sectional form into a modified hole which will be engaged with the modified shaft portion.

Furthermore, according to the present invention, when the first friction plate is constituted such that the rotating shaft and/or the second friction plate will turn together with the bracket, the first friction plate can be locked to the large-diameter portion of the rotating shaft, and the second friction plate to the bracket respectively by means of a locking means.

At this time, according to the present invention, it is possible to form a grease reservoir by making either or both of the first and second friction plates of phosphor bronze, or by providing a small hole or cutout in the surface thereof.

All the foregoing and still further objects and advantages of the present invention will become apparent from a study of the following specification, taken in connection with the accompanying drawings.

DESCRIPTION OF THE PREFERRED EMBODIMENTS

Figure 1:
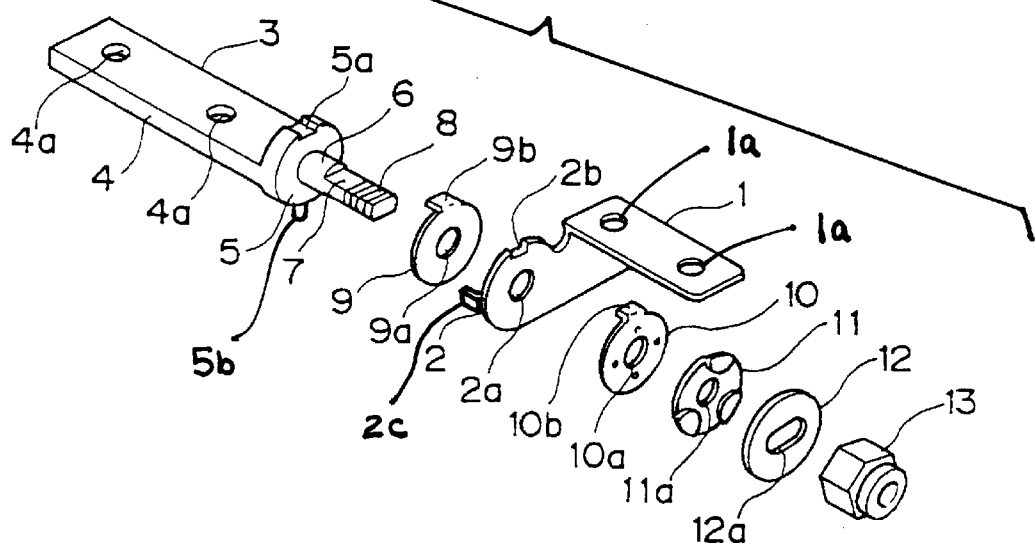
FIG. 1 is an exploded perspective view of a tilt hinge according to the present invention.
Figure 2:
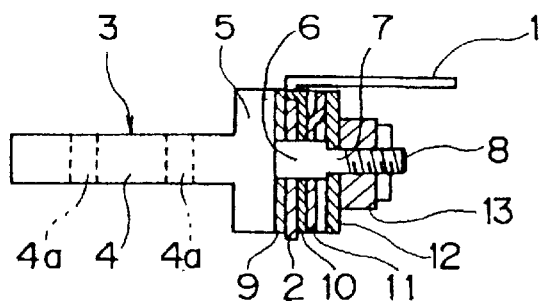
FIG. 2 is a longitudinal sectional view of a tilt hinge assembly shown in FIG. 1.
Figure 3:
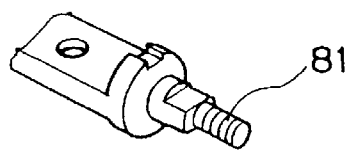
FIG. 3 is a partly perspective view showing another embodiment a rotating shaft.

The accompanying drawings show one embodiment of the present invention; in FIGS. 1 and 2, reference numeral 1 denotes a bracket to be mounted on the body side of a small-type office automation equipment, liquid crystal television set, etc. Its one side portion is bent and protruded to one direction and a bearing hole 2a is provided, thus forming a bearing section 2. Numeral 3 denotes a rotating shaft mounted directly to the opening-closing body of for example a display body or through a mounting member, to thereby openably support the opening-closing body. The rotating shaft 3 is composed of a mounting section 4 provided with mounting holes 4a, 4a formed by cutting both sides, a large-diameter portion 5 having a locking cutout 5a as a later-described friction plate locking means in the outer periphery, a small-diameter portion 6 of round section, a deformed section 7 provided by cutting both sides, and an external thread section 8 formed in the modified section 7. This external thread section may be an external thread section 81 of round section as shown in FIG. 3. These rotating shafts 3 are of a small diameter, for example, 6 to 8 mm in diameter in the large-diameter portion, and around 3 to 4 mm in diameter in the small-diameter section. Furthermore, the locking cutout 5a may be a small hole for locking, or a locking hole or locking projection or lug, or a lock pin mounted on the large-diameter portion.

Figure 4:
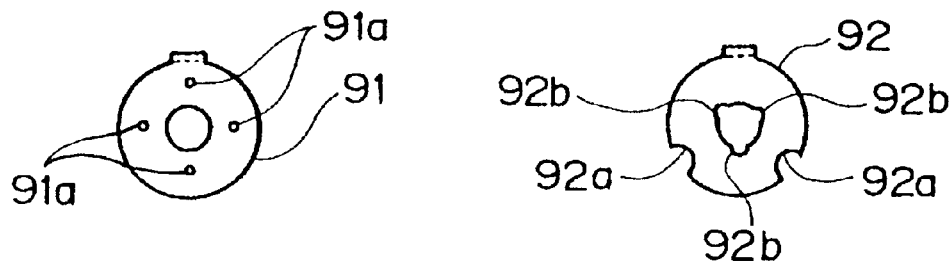
FIGS. 4a and 4b are front views showing another embodiment of a friction plate.

Between the large-diameter portion 5 and one side of the bearing section 2, there is interposed a first friction plate 9 produced of a high-viscosity, wear-resistant material such as phosphor bronze; and while the small-diameter portion is being inserted into an insertion hole 9a of modified sectional form provided at the center thereof, a lock piece 9b as a locking means provided on the outer periphery of the first friction plate 9 is engaged with the locking cutout 5a as the same locking means as the ⇌part provided on the large-diameter portion. For the first friction plate 9, as shown in FIGS. 4a and 4b, there may be used a friction plate 91 provided in the surface with a small hole 91a which serves as a grease reservoir, or a friction plate 92 provided with cutouts 92a and 92b. The lock piece 9b which is a locking means provided on the aforementioned large-diameter portion may be replaced with a small hole, a lock pin, and so forth.

Figure 5:
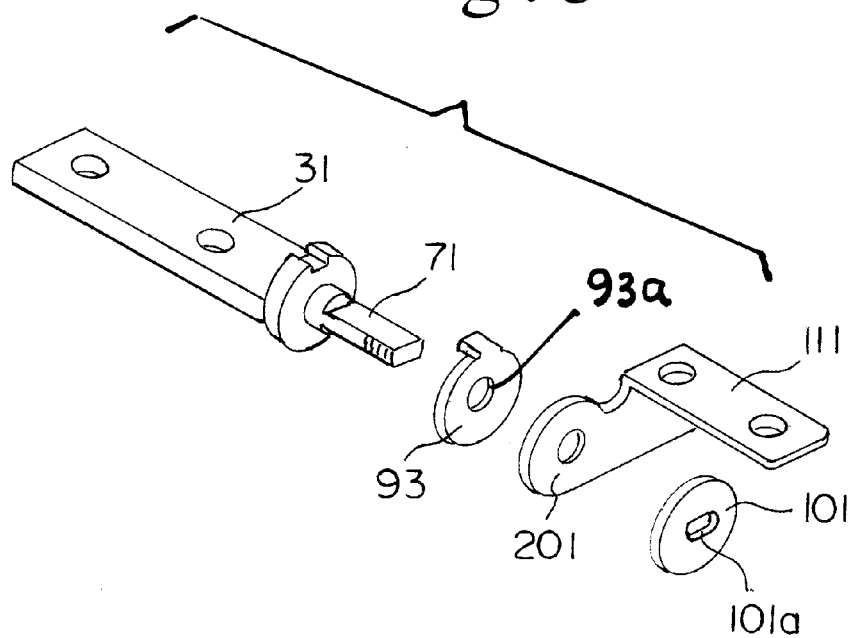
FIG. 5 is a partly exploded view showing another embodiment of the tilt hinge according to the present invention.

On the other side of the bearing section 2, there is provided a second friction plate 10 produced of for instance phosphor bronze and having on the outer periphery a lock piece 10b for engagement with the locking cutout 2b as a locking means provided in the bearing section 2, with the small-diameter portion 6 inserted in an insertion hole 10a of round section. It should be noticed that the locking cutout 2b and the lock piece 10b are not limited to the above-described ones and may be those of other embodiments as in the case of the locking cutout 5a and the lock piece 9b as stated above. Furthermore, as shown in FIG. 5, each of the insertion holes 93a and 101a provided in the first friction plate 93 and the second friction plate 101 may be changed in the sectional form to a form which allows engagement with a small-diameter portion 71 of a rotating shaft 31, to permit rotation together with the rotating shaft 31, thereby enabling dispensing with the lock pieces 9b and 10b. Next, there is provided a spring washer 11, adjacently to the second friction plate 10, with the small-diameter portion 6 being inserted into the insertion hole 11a provided in the center section thereof. The second friction plate 10, as shown in FIGS. 4a and 4b, may be a friction plate provided with a small hole or a cutout which serves as a grease reservoir in the surface thereof.

Furthermore, there is provided a retaining washer 12, adjacently to the spring washer 11, with the modified portion 7 of the rotating shaft 3 being inserted into a modified hole 12a provided in the center section thereof, so that the retaining washer 12 and the spring washer 11 may turn together with the rotating shaft 13. On the external thread section 8 a lock nut 13 (the lock nut of the embodiment is produced of a synthetic resin such as nylon) is screwed, pressing the first and second friction plates 9 and 10, the spring washer 11, and the retaining washer 12 all together in the direction of the axis of the rotating shaft 3. With the bracket 1 attached to the body side of an apparatus such as an office automatic equipment, when the opening-closing body of a display body is mounted to the mounting section of the rotating shaft 3, the rotating shaft 3 rotates to produce friction between the first friction plate 9 and the bearing section 2 of the bracket 1 and between the second friction plate 10 and the spring washer 11. In this case, as shown in FIG. 5, the second friction plate 101 may be designed to be provided with a modified hole 101a which will be engaged with the modified portion 71 of the rotating shaft 31 and turn together with the rotating shaft 31 to thereby produce friction between the second frictionplate 101 and abracket 111. Furthermore, the friction plate of the preferred embodiment is produced of phosphor bronze. This material, however, is not limited to phosphor bronze and may be an ordinary iron plate or a stainless steel plate. Reference numeral 93 denotes the first friction plate rotating together with the rotating shaft 31.

Unlike a prior art tilt hinge in which the rotating shaft 3 is swaged at the end to produce a friction torque, the nut 13 in the tilt hinge of the present invention is tightened to produce the friction torque, and therefore it is possible to press the first and second friction plates 9 and 10 firmer against the adjacent members such as the bracket 1 and the spring washer 11, thereby making it possible to obtain a greater friction torque from a small-diameter small-type frictionplate, and further to obtain a greater friction torque even when a small-type hinge is used. Furthermore, between the large-diameter portion 5 of the rotating shaft 3 and the bracket, there may be used a stopper means consisting of a projection 5b and a lock piece 2c for restricting the permissible angle of rotation of the rotating shaft. Bearing section or plate 2 is bent into the vertical position shown in FIG. 1, from a part of bracket 1 that carries holes 1a for connecting the bracket 1 to the body of an apparatus which uses the hinge.

What is claimed is:

1. A tilt hinge, comprising:

a bracket comprising an attachment plate to be mounted on an apparatus body side and a bearing plate bent from the attachment plate to be perpendicular to the attachment plate and having a bearing hole;

a rotating shaft rotatably supported in the bearing hole formed in the bearing plate of said bracket, said rotating shaft having a mounting section to which an opening-closing body is attached, a large-diameter portion, and a small-diameter portion having an external thread portion, which are formed successively in the axial direction;

a first friction plate provided between said large-diameter portion of said rotating shaft and one side surface of the bearing plate of said bracket such that said small-diameter portion passes through an insertion hole provided at a center portion of said first friction plate and such that said first friction plate rotates together with said rotating shaft;

a second friction plate provided in contact with the other side surface of the bearing plate of said bracket such that said small-diameter portion passes through an insertion hole provided at a center portion of said second friction plate and such that said second friction plate rotates together with said bearing plate;

a spring washer provided in contact with said second friction plate such that said small-diameter portion passes through an insertion hole proved at a center portion of said spring washer and such that said spring washer rotates together with said small-diameter portion;

a retaining washer provided in contact with said spring washer such that said small-diameter portion passes through an insertion hole provided at a center portion of said retaining washer and such that said retaining washer rotates together with said small-diameter portion; and a nut screwed onto the external thread portion of said small-diameter portion in order to press said retaining washer toward said spring washer, wherein upon rotation of said rotating shaft, said first friction plate and said spring washer rotate together, so that friction is generated between said first friction plate and said bearing plate and between said second friction plate and said spring washer.

2. A tilt hinge according to claim 1, wherein for united rotation of said first friction plate and said rotating shaft and for united rotation of said second friction plate and said bracket, said first friction plate is engaged with said large-diameter portion of said rotating shaft via engagement means; and said second friction plate is engaged with said bracket via engagement means.

3. A tilt hinge according to claim 2, wherein either one or both of said first friction plate and said second friction plate have a grease reservoir formed by providing a small hole or a cutout in the surface thereof.

4. A tilt hinge according to claim 1, wherein for united rotation of said first friction plate and said rotating shaft and for united rotation of said second friction plate and said bracket, said small-diameter portion of said rotating shaft has a non-circular shaft portion having a non-circular cross section at a location where said first friction plate is attached; the insertion hole of said first friction plate is a non-circular hole engagable with the non-circular shaft portion; and said second friction plate is engaged with said bracket via engagement means.

5. A tilt hinge according to claim 4, wherein either one or both of said first friction plate and said second friction plate have a grease reservoir formed by providing a small hole or a cutout in the surface thereof.

6. A tilt hinge according to claim 1, wherein between said rotating shaft and said bracket a stopper means is provided to control the permissible angle of rotation of said rotating shaft.

7. A tilt hinge according to claim 6, wherein either one or both of said first friction plate and said second friction plate have a grease reservoir formed by providing a small hole or a cutout in the surface thereof.

8. A tilt hinge according to claim 1, wherein either one or both of said first friction plate and said second friction plate are formed of phosphor bronze.

9. A tilt hinge according to claim 8, wherein either one or both of said first friction plate and said second friction plate have a grease reservoir formed by providing a small hole or a cutout in the surface thereof.

10. A tilt hinge according to claim 1, wherein either one or both of said first friction plate and said second friction plate have a grease reservoir formed by providing a small hole or a cutout in the surface thereof.

* * * * *